United States Patent
Choi et al.

(10) Patent No.: US 9,648,613 B2
(45) Date of Patent: May 9, 2017

(54) METHOD AND APPARATUS FOR GAINING ACCESS IN WIRELESS LAN SYSTEM

(71) Applicant: LG ELECTRONICS INC., Seoul (KR)

(72) Inventors: Jinsoo Choi, Anyang-si (KR); Jeongki Kim, Anyang-si (KR); Giwon Park, Anyang-si (KR); Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/428,109

(22) PCT Filed: Sep. 26, 2013

(86) PCT No.: PCT/KR2013/008626
§ 371 (c)(1),
(2) Date: Mar. 13, 2015

(87) PCT Pub. No.: WO2014/051349
PCT Pub. Date: Apr. 3, 2014

(65) Prior Publication Data
US 2015/0230245 A1    Aug. 13, 2015

Related U.S. Application Data

(60) Provisional application No. 61/706,110, filed on Sep. 26, 2012.

(51) Int. Cl.
*H04W 72/04* (2009.01)
*H04W 74/08* (2009.01)
(Continued)

(52) U.S. Cl.
CPC ....... *H04W 72/0446* (2013.01); *H04W 4/005* (2013.01); *H04W 74/0808* (2013.01);
(Continued)

(58) Field of Classification Search
None
See application file for complete search history.

(56) References Cited

U.S. PATENT DOCUMENTS 9,113,433 B2    8/2015  Park et al.
2006/0274776 A1*  12/2006  Malik ............... H04B 7/00
                                            370/445
(Continued)

FOREIGN PATENT DOCUMENTS

KR    10-2005-0040454    5/2005
KR    10-2005-0082598    8/2005
(Continued)

OTHER PUBLICATIONS

Fallah, et al., "Hybrid OFDMA/CSMA Based Medium Access Control for Next-Generation Wireless LANs," IEEE International Conference on Communications, XP031265842, May 2008, pp. 2762-2768.

(Continued)

*Primary Examiner* — Phirin Sam
(74) *Attorney, Agent, or Firm* — Lee Hong Degerman Kang Waimey

(57) ABSTRACT

A method for gaining access according to one embodiment of the present invention in which a station (STA) gains access to a medium in wireless communication system comprises the steps of: sensing a carrier wave for a medium so as to transmit a set frame; and, if the medium is busy, executing a random back-off procedure, wherein the starting point of the random back-off procedure is indicated by a second parameter randomly selected from within a range in accordance with a first parameter.

20 Claims, 11 Drawing Sheets

(51) Int. Cl.
*H04W 4/00* (2009.01)
*H04W 76/06* (2009.01)
*H04W 84/12* (2009.01)
*H04W 28/18* (2009.01)
*H04W 88/08* (2009.01)

(52) U.S. Cl.
CPC ..... *H04W 74/0816* (2013.01); *H04W 76/068* (2013.01); *H04W 28/18* (2013.01); *H04W 74/0833* (2013.01); *H04W 84/12* (2013.01); *H04W 88/08* (2013.01)

(56) References Cited

U.S. PATENT DOCUMENTS

| | | | |
|---|---|---|---|
| 2007/0032255 A1 | 2/2007 | Koo et al. | |
| 2007/0297353 A1* | 12/2007 | Habetha | H04W 74/02 370/310 |
| 2009/0213815 A1* | 8/2009 | Sherman | H04W 74/0841 370/336 |
| 2010/0074263 A1* | 3/2010 | Bry | H04L 12/2834 370/401 |
| 2010/0135319 A1 | 6/2010 | Wang et al. | |
| 2010/0182925 A1* | 7/2010 | Nagata | H04L 43/0894 370/252 |
| 2010/0317383 A1* | 12/2010 | Lee | H04W 52/242 455/501 |
| 2011/0058493 A1 | 3/2011 | Kapadia et al. | |
| 2013/0051318 A1* | 2/2013 | Matsuo | H04B 15/02 370/328 |
| 2013/0235773 A1* | 9/2013 | Wang | H04W 52/0206 370/311 |
| 2014/0003367 A1* | 1/2014 | Viger | H04W 74/0816 370/329 |
| 2014/0003414 A1* | 1/2014 | Choudhury | H04W 74/006 370/347 |
| 2014/0010081 A1* | 1/2014 | Benveniste | H04L 47/10 370/230 |

FOREIGN PATENT DOCUMENTS

| | | |
|---|---|---|
| KR | 10-2007-0101018 | 10/2007 |
| KR | 10-2012-0071894 | 7/2012 |
| WO | 2012/070879 | 5/2012 |
| WO | 2012/083889 | 6/2012 |
| WO | 2012/124881 | 9/2012 |
| WO | 2012/163257 | 12/2012 |

OTHER PUBLICATIONS

European Patent Office Application Serial No. 138426283, Search Report dated Jan. 13, 2016, 10 pages.

Han, et al., "A Medium Access Mechanism to Support Urgent Message Transmission," The Journal of IIBC. vol. 10, No. 1, Feb. 2010, pp. 97-105.

PCT International Application No. PCT/KR2013/008626, Written Opinion of the International Searching Authority dated Dec. 31, 2013, 1 page.

\* cited by examiner

METHOD AND APPARATUS FOR GAINING ACCESS IN WIRELESS LAN SYSTEM

CROSS-REFERENCE TO RELATED APPLICATIONS

This application is the National Stage filing under 35 U.S.C. 371 of International Application No. PCT/KR2013/008626, filed on Sep. 26, 2013, which claims the benefit of U.S. Provisional Application Ser. No. 61/706,110, filed on Sep. 26, 2012, the contents of which are all hereby incorporated by reference herein in their entirety.

TECHNICAL FIELD

The present invention relates to a wireless communication system, and more particularly, to a method and apparatus for gaining access in a Wireless Local Area Network (WLAN) system.

BACKGROUND ART

Along with the recent development of information and communication technology, various wireless communication technologies are under development. Among them, WLAN is a technology that enables wireless access to the Internet through a portable terminal such as a Personal Digital Assistant (PDA), a laptop computer, a Portable Multimedia Player (PMP), etc. in a home, an office, or a specific service area by radio frequency technology.

To overcome the limitations of WLAN in communication speed, the recent technology standards have introduced a system that increases network speed and reliability and extends the coverage of a wireless network. For example, Institute of Electrical and Electronics Engineers (IEEE) 802.11n adopts Multiple Input Multiple Output (MIMO) using multiple antennas at both a transmitter and a receiver in order to support High Throughput (HT) with a data processing rate of up to 540 Mbps, minimize transmission errors, and optimize a data rate.

Machine-to-Machine (M2M) communication is under discussion as a future-generation communication technology. IEEE 802.11 WLAN is also developing a technology standard for M2M communication as IEEE 802.11ah. For M2M communication, a scenario in which a small amount of data is transmitted at a low rate intermittently in an environment with a large number of devices may be considered.

Communication is conducted through a medium shared among all devices in a WLAN system. If the number of devices is increased as in M2M communication, a channel access mechanism needs to be improved more efficiently in order to reduce unnecessary power consumption and interference.

DISCLOSURE

Technical Problem

An object of the present invention devised to solve the conventional problem is to overcome congestion that may occur when a plurality of Stations (STAs) access a medium simultaneously.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for accessing a medium by a Station (STA) in a wireless communication system includes performing carrier sensing on a medium, for transmitting a frame, and performing a random backoff procedure, if the medium is busy. A starting point of the random backoff procedure is indicated by a second parameter randomly selected from a range determined based on a first parameter.

In another aspect of the present invention, an STA for accessing a medium in a wireless communication system includes a transceiver and a processor. The processor is configured to perform carrier sensing on a medium, for transmitting a frame, and to perform a random backoff procedure, if the medium is busy. A starting point of the random backoff procedure is indicated by a second parameter randomly selected from a range determined based on a first parameter.

The above aspects of the present invention may include the followings.

The performing of a random backoff procedure may include randomly selecting a time value set for a backoff timer, decreasing the time value set for the backoff timer in units of a slot time until the medium is idle, and transmitting the frame, upon expiration of the time value set for the backoff timer. If it is determined that the medium is busy during decreasing the timer value, the decreasing may be discontinued.

The frame may be an authentication request frame.

The resource unit may be a time slot for the authentication request frame.

The first parameter may be assigned by an Access Point (AP) with which the STA is associated.

The STA may be one of a plurality of STAs attempting transmission of the frame simultaneously.

The second parameter may be a number of a time slot included in the range determined based on the first parameter, and may be determined by modulo-operating an Identifier (ID) of the STA with the number of time slots included in the range determined based on the first parameter.

If the STA is included in a channel access group, selection of the second parameter may be limited to a time slot allocated to the channel access group in the range determined based on the first parameter.

If the STA performs reassociation with the AP, the STA may use a first parameter received before the reassociation.

If the first parameter is transmitted by an AP, a value of the first parameter may be decreased, each time the first parameter is transmitted.

The first parameter may be included in one of a beacon frame and a short beacon frame.

The first parameter may be included in one of a unicast probe response frame and a broadcast probe response frame.

The random backoff procedure may be for one of Distributed Coordination Function (DCG) and Enhanced Distributed Channel Access (EDCA).

Advantageous Effects

According to the present invention, when a huge number of Stations (STAs) access a channel simultaneously after power outage, disaster, etc. happens, the channel accesses can be efficiently distributed and thus congestion can be overcome.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiments of the invention and together with the description serve to explain the principle of the invention. In the drawings.

BEST MODE FOR CARRYING OUT THE INVENTION

Figure 1:
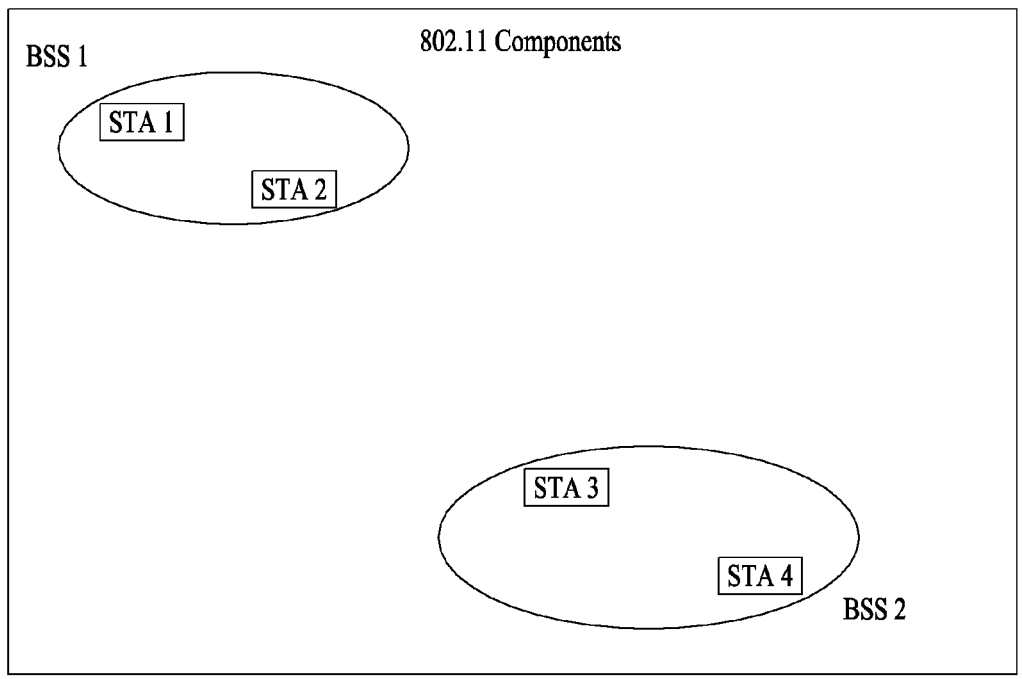
FIG. 1 illustrates an exemplary configuration of an Institute of Electrical and Electronics Engineers (IEEE) 802.11 system to which the present invention is applicable.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

Specific terms used for the embodiments of the present invention are provided to help the understanding of the present invention. These specific terms may be replaced with other terms within the scope and spirit of the present invention.

In some instances, known structures and devices are omitted or are shown in block diagram form, focusing on important features of the structures and devices, so as not to obscure the concept of the invention. Like reference numerals denote the same components throughout the specification.

The embodiments of the present invention may be supported by standard documents disclosed for at least one of wireless access systems, Institute of Electrical and Electronics Engineers (IEEE) 802, $3^{rd}$ Generation Partnership Project (3GPP), 3GPP Long Term Evolution (3GPP LTE), LTE-Advanced (LTE-A), and 3GPP2. Steps or parts that are not described to clarify the technical features of the present invention may be supported by those documents. Further, all terms as set forth herein may be explained by the standard documents.

Techniques described herein may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA), etc. While the embodiments of the present invention will be described below in the context of an IEEE 802.11 system for clarity of description, this is purely exemplary and thus should not be constructed as limiting the present invention.

Architecture of Wireless Local Area Network (WLAN) System

FIG. 1 illustrates an exemplary configuration of an IEEE 802.11 system to which the present invention is applicable.

The IEEE 802.11 architecture may include a plurality of components. A WLAN that supports Station (STA) mobility transparent to upper layers may be provided through interaction between the components. A Basic Service Set (BSS) is a basic building block of an IEEE 802.11 LAN. FIG. 1 illustrates two BSSs, BSS1 and BSS2, each with two STAs that are members of the BSS (STA1 and STA2 are included in BSS1 and STA3 and STA4 are included in BSS2). Each of the BSSs covers an area in which the STAs of the BSS maintain communication, as indicated by an oval. This area may be referred to as a Basic Service Area (BSA). As an STA moves out of its BSA, it can no longer communicate directly with other members of the BSA.

An Independent Basic Service Set (IBSS) is the most basic type of BSS in the IEEE 802.11 LAN. For example, a minimum IBSS includes only two STAs. A BSS, BSS1 or BSS2 which is the most basic type without other components in FIG. 1 may be taken as a major example of the IBSS. This configuration may be realized when STAs communicate directly. Because this type of LAN is often formed without pre-planning for only as long as the LAN is needed, it is often referred to as an ad hoc network.

The membership of an STA in a BSS may be dynamically changed when the STA is powered on or off or the STA moves into or out of the coverage area of the BSS. To be a member of the BSS, an STA may join the BSS by synchronization. To access all services of a BSS infrastructure, the STA should be associated with the BSS. This association may be dynamically performed and may involve use of a Distributed System Service (DSS).

Figure 2:
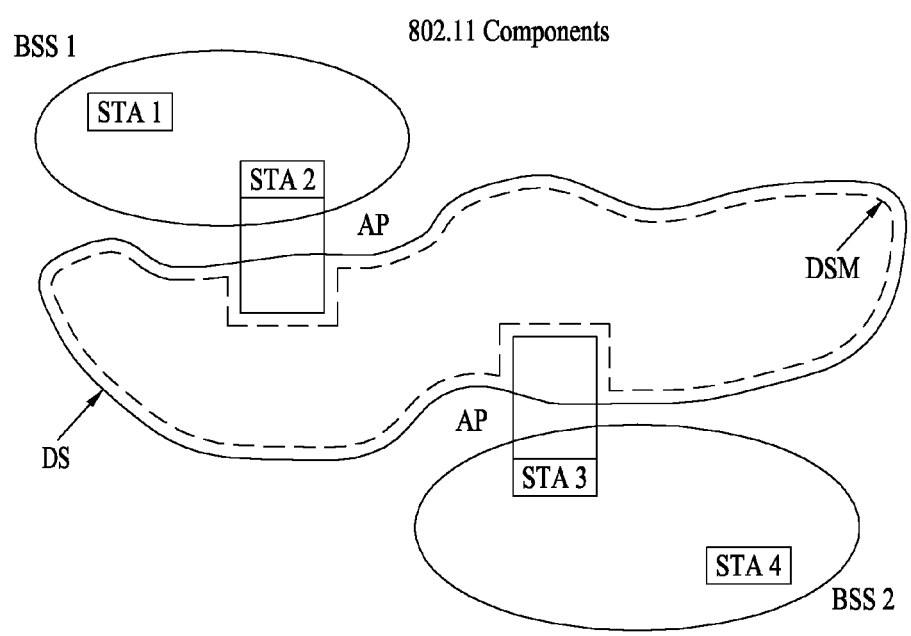
FIG. 2 illustrates another exemplary configuration of an IEEE 802.11 system to which the present invention is applicable.

FIG. 2 illustrates another exemplary configuration of the IEEE 802.11 system to which the present invention is applicable. In FIG. 2, components such as a Distribution System (DS), a Distribution System Medium (DSM), and an Access Point (AP) are added to the architecture illustrated in FIG. 1.

Physical (PHY) performance may limit direct STA-to-STA distances. While this distance limitation is sufficient in some cases, communication between STAs apart from each other by a long distance may be required. To support extended coverage, a DS may be deployed.

A DS is built from multiple BSSs that are interconnected. Specifically, a BSS may exist as a component of an extended network with a plurality of BSSs, rather than it exists independently as illustrated in FIG. 1.

The DS is a logical concept and may be specified by the characteristics of a DSM. In this regard, the IEEE 802.11 standard logically distinguishes a Wireless Medium (WM) from a DSM. Each logical medium is used for a different purpose by a different component. The IEEE 802.11 standard does not define that these media should be the same or different. The flexibility of the IEEE 802.11 LAN architecture (DS structure or other network structures) may be explained in the sense that a plurality of media are logically different. That is, the IEEE 802.11 LAN architecture may be built in various manners and may be specified independently of the physical characteristics of each implementation example.

The DS may support mobile devices by providing services needed to handle address to destination mapping and seamless integration of multiple BSSs.

An AP is an entity that enables its associated STAs to access a DS through a WM and that has STA functionality. Data may move between the BSS and the DS through the AP. For example, STA2 and STA3 illustrated in FIG. 2 have STA functionality and provide a function of enabling associated STAs (STA1 and STA4) to access the DS. Since all APs are basically STAs, they are addressable entities. An address used by an AP for communication on the WM is not necessarily identical to an address used by the AP for communication on the DSM.

Data that one of STAs associated with the AP transmits to an STA address of the AP may always be received at an uncontrolled port and processed by an IEEE 802.1X port access entity. If a controlled port is authenticated, transmission data (or frames) may be transmitted to the DS.

Figure 3:
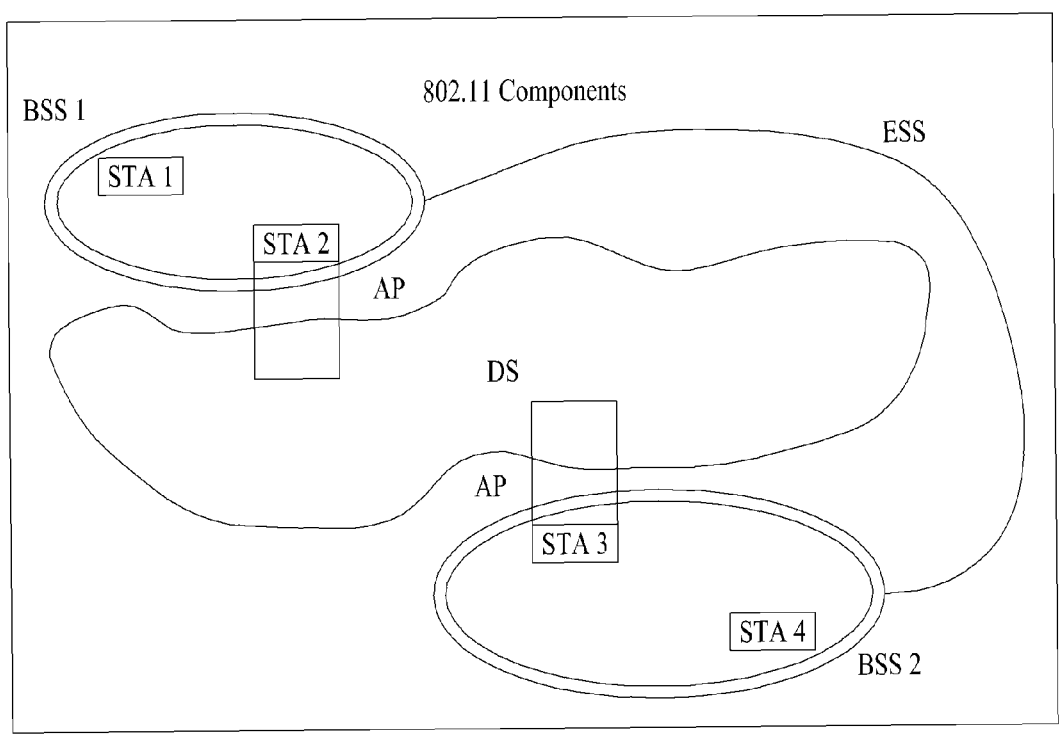
FIG. 3 illustrates another exemplary configuration of an IEEE 802.11 system to which the present invention is applicable.

FIG. 3 illustrates another exemplary configuration of the IEEE 802.11 system to which the present invention is applicable. In addition to the architecture illustrated in FIG. 2, FIG. 3 conceptually illustrates an Extended Service Set (ESS) to provide extended coverage.

A DS and BSSs allow IEEE 802.11 to create a wireless network of arbitrary size and complexity. IEEE 802.11 refers to this type of network as an ESS network. An ESS may be a set of BSSs connected to a single DS. However, the ESS does not the DS. The ESS network appears as an IBSS network to a Logical Link Control (LLC) layer. STAs within an ESS may communicate with each other and mobile STAs may move from one BSS to another (within the same ESS) transparently to the LLC layer.

IEEE 802.11 assumes nothing about the relative physical locations of the BSSs in FIG. 3. All of the followings are possible. The BSSs may partially overlap. This is commonly used to arrange contiguous coverage. The BSSs may be physically disjointed. Logically, there is no limit to the distance between BSSs. The BSSs may be physically co-located. This may be done to provide redundancy. One (or more) IBSS or ESS networks may be physically present in the same space as one (or more) ESS networks. This may arise when an ad hoc network is operating at a location that also has an ESS network, when physically overlapping IEEE 802.11 networks have been set up by different organizations, or when two or more different access and security policies are needed at the same location.

Figure 4:
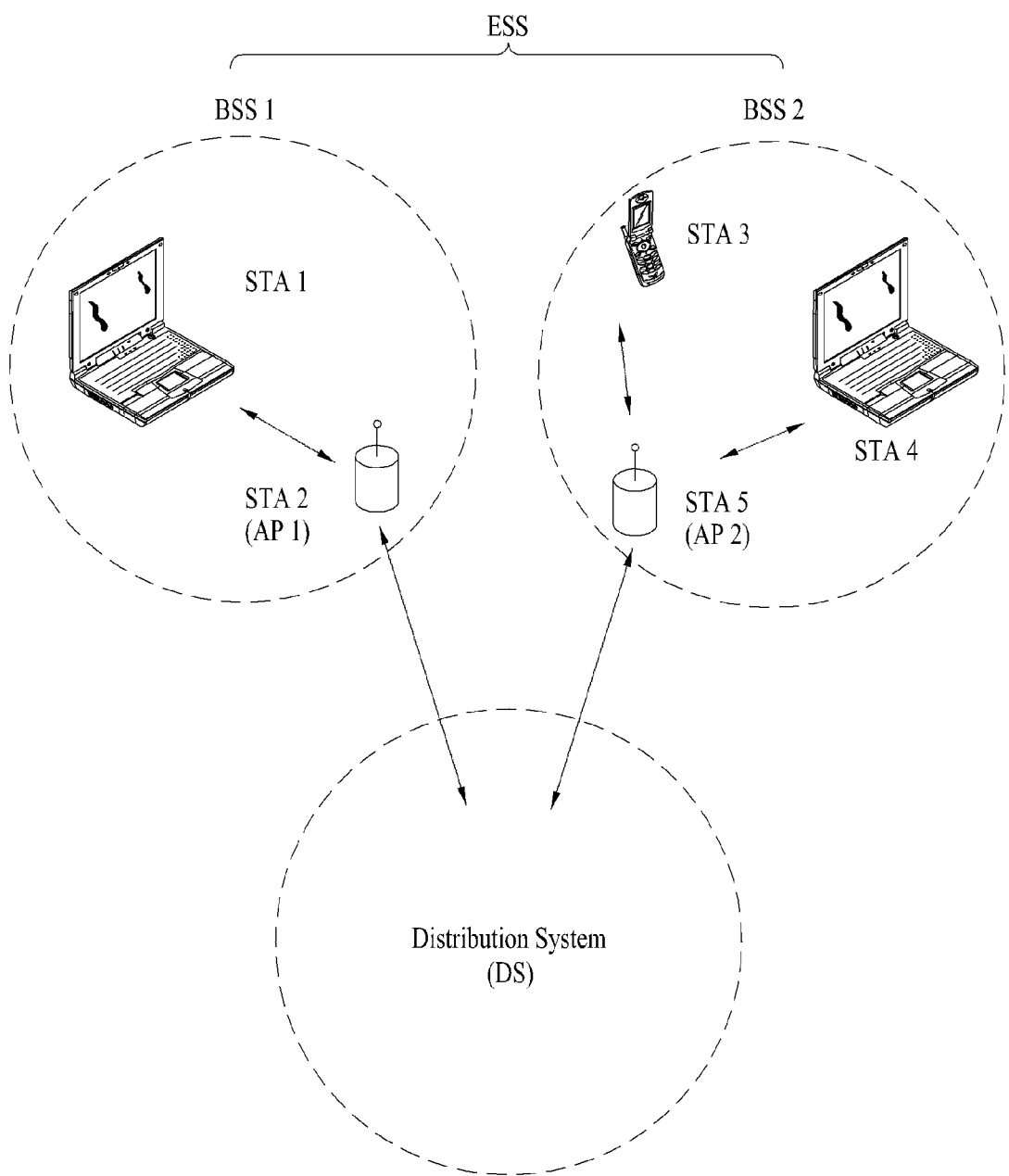
FIG. 4 illustrates an exemplary configuration of a Wireless Local Area Network (WLAN) system.

FIG. 4 illustrates an exemplary configuration of a WLAN system. In FIG. 4, an exemplary infrastructure BSS including a DS is illustrated.

In the example of FIG. 4, an ESS includes BSS1 and BSS2. In the WLAN system, an STA is a device complying with Medium Access Control/Physical (MAC/PHY) regulations of IEEE 802.11. STAs are categorized into AP STAs and non-AP STAs. The non-AP STAs are devices handled directly by users, such as laptop computers and mobile phones. In FIG. 4, STA1, STA3, and STA4 are non-AP STAs, whereas STA2 and STA5 are AP STAs.

In the following description, a non-AP STA may be referred to as a terminal, a Wireless Transmit/Receive Unit (WTRU), a User Equipment (UE), a Mobile Station (MS), a Mobile Terminal (MT), or a Mobile Subscriber Station (MSS). An AP corresponds to a Base Station (BS), a Node B, an evolved Node B (eNB), a Base Transceiver System (BTS), or a femto BS in other wireless communication fields.

Link Setup Procedure

Figure 5:
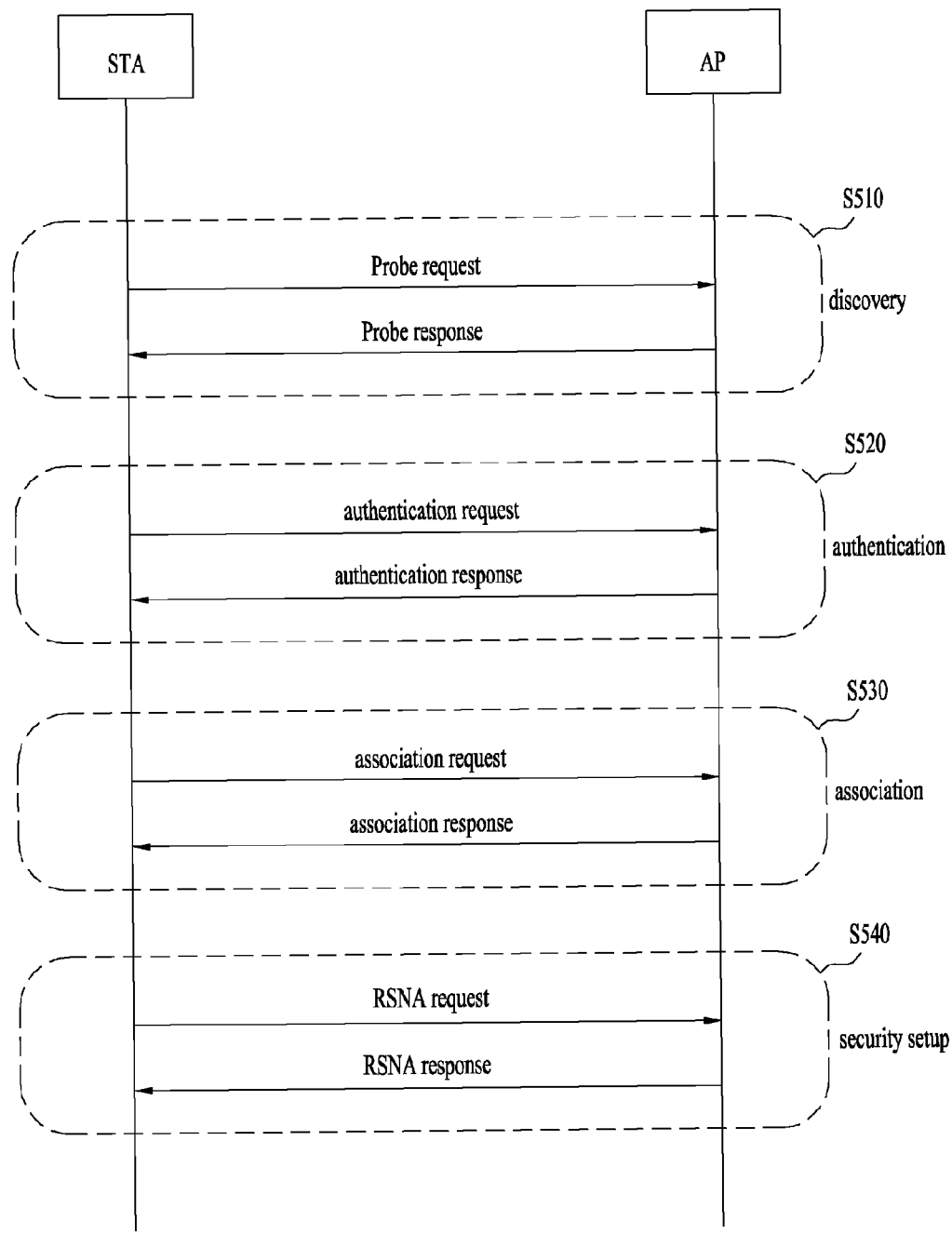
FIG. 5 illustrates a link setup procedure in a WLAN system.

FIG. 5 is a view referred to for describing a general link setup procedure.

In order to establish a link with a network and transmit and receive data to and from the network, an STA should discover, authenticate, associate with, and perform an authentication procedure for security with the network. The link setup procedure may be referred to as a session initiation procedure or a session setup procedure. Discovery, authentication, association, and security setup of the link setup procedure may be collectively called an association procedure.

An exemplary link setup procedure will be described below with reference to FIG. 5.

In step S510, an STA may discover a network. The network discovery may include the STA's scanning That is, the STA should search for a joinable network to access the network. The STA needs to identify a compatible network before joining a wireless network. Identification of a network present in a specific area is referred to as scanning.

Scanning is categorized into active scanning and passive scanning.

FIG. 5 illustrates a network discovery operation including active scanning, by way of example. An STA performing active scanning transmits a probe request frame and awaits reception of a response to the transmitted probe request frame, while switching between channels, to determine which AP is present around the STA. A responder transmits a probe response frame in response to the probe request frame to the STA that has transmitted the probe request frame. Here, the responder may be an STA that has transmitted a last beacon frame in a BSS of the scanned channel. Since an AP transmits a beacon frame in a BSS, the AP is a responder. Since STAs sequentially transmit a beacon frame, a responder is not the same in an IBSS. For example, an STA, which has transmitted a probe request frame in channel #1 and has received a probe response frame in channel #1, stores BSS-related information included in the received probe response frame, and moves to the next channel (e.g. channel #2). In the same manner, the STA may perform scanning on the next channel (i.e. probe request/response transmission and reception in channel #2).

While not shown in FIG. 5, the scanning may be passive scanning An STA that performs passive scanning awaits reception of a beacon frame while moving from one channel to another. The beacon frame is one of management frames in IEEE 802.11. The beacon frame is periodically transmitted to announce the presence of a wireless network and allow a scanning STA to search for the wireless network and thus join the wireless network. In a BSS, an AP is configured to periodically transmit a beacon frame, whereas in an IBSS, STAs are configured to sequentially transmit a beacon frame. Upon receipt of a beacon frame, a scanning STA stores BSS-related information included in the beacon frame and moves to another channel. In this manner, the STA stores beacon frame information on each channel. Upon receipt of the beacon frame, the STA may store BSS-related information included in the received beacon frame, move to the next channel, and perform scanning on the next channel in the same manner.

Active scanning is more advantageous than passive scanning in terms of delay and power consumption.

After discovering the network, the STA may perform an authentication procedure in step S520. The authentication procedure may be referred to as a first authentication procedure to be distinguished from a security setup procedure performed in step S540.

The authentication procedure includes transmission of an authentication request frame to an AP by an STA and transmission of an authentication response frame to the STA by the AP in response to the authentication request frame. The authentication frame used for authentication request/response is a management frame.

The authentication frame may include information about an authentication algorithm number, an authentication transaction sequence number, a state code, challenge text, a Robust Security Network (RSN), a Finite Cyclic Group (FCG), etc. The above-mentioned information contained in the authentication frame is an exemplary part of information that may be included in the authentication request/response frame. The information may be replaced with other information or include additional information.

The STA may transmit the authentication request frame to the AP. The AP may determine whether to accept authentication of the STA based on the information included in the received authentication request frame. The AP may provide an authentication processing result to the STA in the authentication response frame.

After the STA is successfully authenticated, an association procedure may be performed in step S530. The association procedure includes transmission of an association request frame to the AP by the STA and transmission of an association response frame to the STA by the AP in response to the association request frame.

For example, the association request frame may include information related to various capabilities, a beacon listening interval, a Service Set Identifier (SSID), supported rates, supported channels, an RSN, a mobility domain, supported operating classes, a Traffic Indication Map (TIM) broadcast request, interworking service capability information, etc.

For example, the association response frame may include information associated with various capabilities, a status code, an Association Identification (AID), supported rates, an Enhanced Distributed Channel Access (EDCA) parameter set, a Received Channel Power Indicator (RCPI), a Received Signal to Noise Indicator (RSNI), a mobility domain, a timeout interval (association comeback time), an overlapping BSS scan parameter, a TIM broadcast response, a Quality of Service (QoS) map, etc.

The above-mentioned information is an exemplary part of information that may be included in the association request/response frame. The information may be replaced with other information or may include additional information.

After the STA is successfully associated with the network, a security setup procedure may be performed in step S540. The security setup process of step S540 may be referred to as an authentication procedure based on a Robust Security Network Association (RSNA) request/response. The authentication procedure of step S520 may be referred to as a first authentication procedure and the security setup procedure of step S540 may be referred to simply as an authentication procedure.

The security setup procedure of step S540 may include private key setup through 4-way handshaking, for example, by an Extensible Authentication Protocol over LAN (EAPOL) frame. In addition, the security setup procedure may be performed according to any other security scheme that is not defined in the IEEE 802.11 standard.

Evolution of WLAN

To overcome the limitations of WLAN in communication speed, IEEE 802.11n has recently been established as a communication standard. IEEE 802.11n seeks to increase network speed and reliability and extend wireless network coverage. More specifically, IEEE 802.11n supports a High Throughput (HT) of up to 540 Mbps or higher. To minimize transmission errors and optimize data rates, IEEE 802.11n is based on Multiple Input Multiple Output (MIMO) using a plurality of antennas at each of a transmitter and a receiver.

Along with the increased use of WLAN and the development of diverse WLAN-based applications, there is a pressing need for a new WLAN system that supports a higher throughput than a throughput supported by IEEE 802.11n. A next-generation WLAN system supporting a Very High Throughput (VHT) is the next version to IEEE 802.11n WLAN (e.g. IEEE 802.11ac). It is one of systems that have been recently proposed to support a data processing rate of 1 Gbps or higher in a MAC Service Access Point (SAP).

The next-generation WLAN system supports a Multi-User (MU)-MIMO transmission scheme in which a plurality of STAs simultaneously access a channel in order to efficiently utilize radio channels. In the MU-MIMO transmission scheme, an AP may transmit a packet to at least one MIMO-paired STA simultaneously.

In addition, support of a WLAN system operation in White Space (WS) is under discussion. For example, the introduction of a WLAN system in TV WS such as an idle frequency band (e.g. a 54 to 698 MHz band) due to transitioning from analog TV to digital TV has been discussed under the IEEE 802.11af standard. However, this is purely exemplary and the WS may be a licensed band that a licensed user may use with priority. The licensed user is a user who has authority to use the licensed band. The licensed user may also be referred to as a licensed device, a primary user, an incumbent user, etc.

For example, an AP and/or an STA operating in WS should protect a licensed user. For example, if a licensed user such as a microphone has already been using a specific WS channel, that is, a frequency band regulated to be divided by a specific bandwidth in the WS band, the AP and/or the STA are not allowed to use the frequency band of the WS channel in order to protect the licensed user. If the licensed user is to use a frequency band that the AP and/or STA is using for frame transmission and/or reception, the AP and/or the STA should discontinue using the frequency band.

Therefore, the AP and/or the STA needs to determine whether the specific frequency band of the WS band is available, that is, whether a licensed user occupies the frequency band. Determination as to whether a licensed user is present in a specific frequency band is referred to as spectrum sensing. Energy detection scheme, signature detection, etc. are used as a spectrum sensing mechanism. If the strength of a received signal is equal to or larger than a predetermined value or a DTV preamble is detected, the AP and/or the STA may determine that a licensed user is using the frequency band.

Machine-to-machine (M2M) communication is under discussion as a next-generation communication technology. A technical standard of supporting M2M communication has been developed as IEEE 802.11ah in the IEEE 802.11 WLAN system. M2M communication is a communication scheme involving one or more machines. M2M communication may also be called Machine Type Communication (MTC) or machine-to-machine communication. A machine is an entity that does not require direct manipulation or intervention of a user. For example, not only a meter or vending machine equipped with a wireless communication module but also a User Equipment (UE) such as a smartphone capable of automatically accessing a network and communicating with the network without user manipulation/intervention may be machines. M2M communication may include Device-to-Device (D2D) communication, communication between a device and an application server, etc. Examples of communication between a device and an application server include communication between a vending machine and a server, communication between a Point Of Sale (POS) device and a server, and communication between an electric meter, a gas meter, or a water meter and a server. M2M communication-based applications may also include security, transportation, healthcare, etc. Considering the foregoing application examples, M2M communication should support occasional transmission/reception of a small amount of data at low rate under an environment with a huger number of devices.

More specifically, M2M communication should support a large number of STAs. Although a currently defined WLAN system is based on the premise that up to 2007 STAs are associated with one AP, methods for supporting association of more (about 6000) STAs with a single AP have been discussed in M2M communication. It is expected that many applications will support/require low rates in M2M communication. To fulfill these requirements, an STA may recognize the presence or absence of data to receive based on a TIM element in the WLAN system. In this regard, methods for reducing the bitmap size of the TIM have been discussed. It is also expected that much traffic will have a very long transmission/reception interval in M2M communication. For example, a very small amount of data needs to be transmitted and received at long intervals (e.g. every month), as is the case with electric/gas/water metering. Accordingly, although more and more STAs can be associated with a single AP in the WLAN system, methods for efficiently supporting a case in which a very small number of STAs are supposed to receive data frames from the AP during one beacon interval have been discussed.

As described above, the WLAN technology is rapidly evolving. Aside from the above-described examples, other techniques for performing direct link setup, improving media streaming throughput, supporting high-speed and/or large-scale initial session setup, and supporting extended bandwidth and operating frequency are being developed.

Medium Access Mechanism

In a WLAN system complying with IEEE 802.11, a basic access mechanism of the MAC layer is Carrier Sense Multiple Access with Collision Avoidance (CSMA/CA). The CSMA/CA mechanism is also referred to as Distributed Coordination Function (DCF) of the IEEE 802.11 MAC layer, which basically adopts a "listen before talk" access mechanism. In this type of access mechanism, an AP and/or an STA may sense a wireless channel or a medium during a predetermined time period (e.g. DCF Inter-Frame Space (DIFS)) by Clear Channel Assessment (CCA) before starting transmission. If the AP and/or the STA determines that the medium is idle as a result of the sensing, the AP and/or the STA starts frame transmission using the medium. On the other hand, if the AP and/or the STA determines that the medium is occupied, the AP and/or the STA does not start its transmission. Instead, the AP and/or the STA may attempt to perform frame transmission after setting a delay time (e.g. a random backoff period) for medium access and waiting for the delay time. As it is expected that multiple STAs attempt to perform frame transmission after waiting for different time periods by applying random backoff periods, collision may be minimized.

An IEEE 802.11 MAC protocol provides a Hybrid Coordination Function (HCF) which is based on a DCF and a Point Coordination Function (PCF). The PCF is a polling-based synchronous access scheme in which periodic polling is performed periodically to allow all receiving APs and/or STAs to receive a data frame. The HCF includes Enhanced Distributed Channel Access (EDCA) and HCF Controlled Channel Access (HCCA). EDCA is a contention-based access scheme used for a provider to provide a data frame to a plurality of users, and HCCA is a contention-free channel access scheme based on polling. The HCF includes a medium access mechanism for improving QoS of a WLAN. In the HCF, QoS data may be transmitted during both a Contention Period (CP) and a Contention-Free period (CFP).

Figure 6:
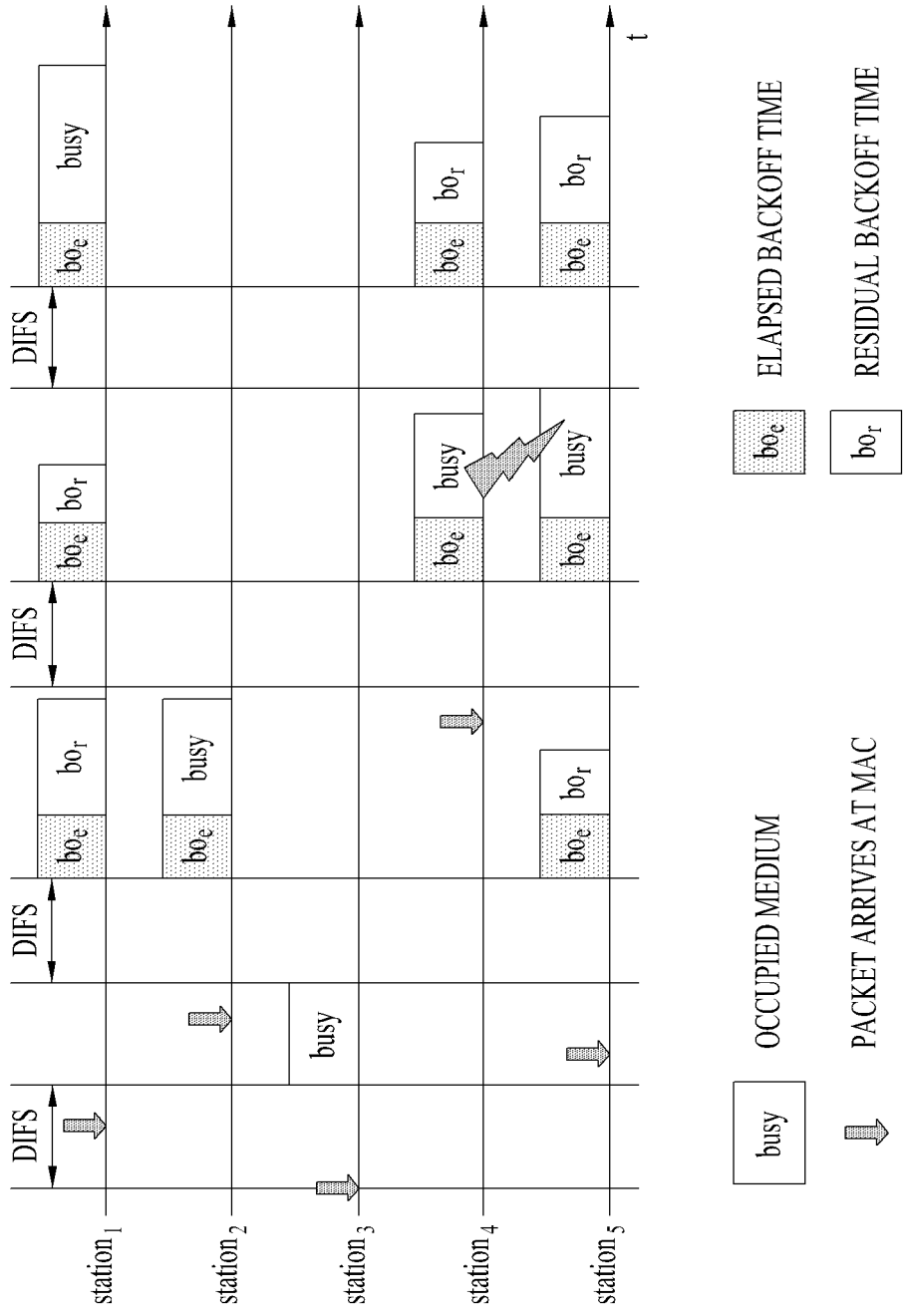
FIG. 6 illustrates a backoff procedure.

FIG. 6 is a view referred to for describing a backoff procedure.

An operation based on a random backoff period will be described with reference to FIG. 6. If a medium transitions from an occupied or busy state to an idle state, a plurality of STAs may attempt to transmit data (or frames). To minimize collision, each STA may select a random backoff count, wait for as long a slot time period as the selected backoff count, and then attempt transmission. The random backoff count may be a pseudo-random integer and selected from a range of 0 to CW. CW is a contention window parameter. Although CWmin is initially set to CWmin, it may be doubled upon transmission failure (e.g. in the case where an ACK for a transmitted frame is not received). If CW reaches CWmax, the STAs may attempt data transmission using CWmax until the data transmission is successful. If the data transmission is successful, CW is reset to CWmin. Preferably, CW, CWmin, and CWmax may be set to $2^n-1$ (where n=0, 1, 2, ...).

When the random backoff procedure starts, the STA continuously monitors the medium while counting down backoff slots according to the determined backoff count. If the medium is monitored as occupied, the STA discontinues the count-down and waits. When the medium becomes idle, the STA resumes the count-down of the remaining backoff slots.

In the illustrated case of FIG. 6, if a transmission packet arrives at the MAC layer of STA3, STA3 may immediately transmit a frame, confirming that the medium is idle. In the meantime, the remaining STAs monitor the medium as busy and wait. While the remaining STAs wait, transmission data may be generated in each of STA1, STA2, and STA5. If each of STA1, STA2, and STA5 monitors the medium as idle, the STA may wait for a DIFS and then count down backoff slots according to its selected random backoff count. In FIG. 6, STA2 selects a smallest backoff count and STA1 selects a largest backoff count That is, at the moment STA2 finishes backoff counting and then starts to transmit a frame, the residual backoff time of STA5 is shorter than that of STA1. While STA is occupying the medium, STA1 and STA5 temporarily discontinue count-down and wait. If STA2 does not occupy the medium any longer and thus the medium becomes idle, STA1 and STA5 wait for a DIFS and resume the backoff counting. That is, after counting down as many remaining backoff slots as the remaining residual backoff time, each of STA1 and STA5 may start frame transmission. Since the residual backoff time of STA5 is shorter than that of STA1, STA5 starts frame transmission. While STA2 is occupying the medium, transmission data may also be generated in STA4. If the medium becomes idle, STA4 may wait for the DIFS, count down backoff slots according to its selected random backoff count, and then start frame transmission. In FIG. 6, the residual backoff time of STA5 happens to be equal to that of STA4. In this case, collision may occur between STA4 and STA5. When collision occurs, either STA4 or STA5 does not receive an ACK, resulting in data transmission failure. Then, STA4 and STA5 may double CW values, select random backoff counts, and then count down backoff slots. While the medium is occupied for transmission of STA and STA5, STA1 may wait. Then if the medium becomes idle, STA1 may wait for the DIFS and start frame transmission after its residual backoff time.

Sensing Operation of STA

As described before, the CSMA/CA mechanism includes virtual carrier sensing as well as physical carrier sensing in which an AP and/or an STA directly senses a medium. Virtual carrier sensing is performed to overcome problems that may be encountered with medium access, such as a hidden node problem. For virtual carrier sensing, the MAC layer of the WLAN system may use a Network Allocation Vector (NAV). An AP and/or an STA, which is currently using the medium or has authority to use the medium, indicates a time left until the medium is available to anther AP and/or another STA by a NAV. Accordingly, the NAV indicates a time period scheduled for the AP and/or the STA transmitting the frame to use the medium. Upon receipt of the NAV, an STA is not allowed to access the medium during the time period. The NAV may be set, for example, according to a value set in a "duration" field of a MAC header of a frame.

A robust collision detection mechanism has been introduced to reduce the probability of collision. This robust collision detection mechanism will be described with reference to FIGS. 7 and 8. While a carrier sensing range may be different from a transmission range in real implementation, it is assumed that the carrier sensing range and the transmission range are the same, for the convenience of description.

Figure 7:
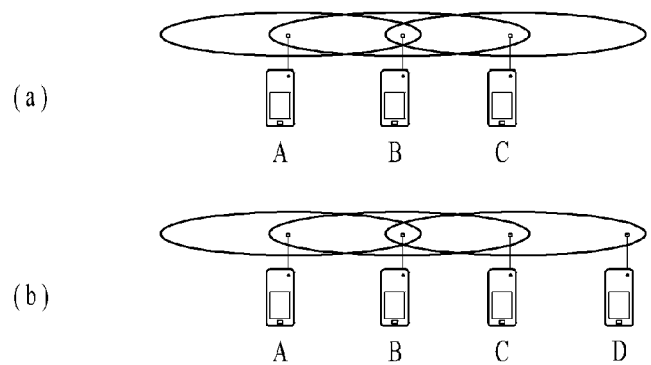
FIG. 7 illustrates a hidden node and an exposed node.

FIG. 7 is a view referred to for describing hidden nodes and exposed nodes.

FIG. 7(a) illustrates an exemplary hidden node. In FIG. 7(a), STA A is communicating with STA B, and STA C has information to be transmitted. Specifically, STA C may determine that a medium is idle during carrier sensing before transmitting data to STA B, although STA A is transmitting information to STA B. This may occur because transmission of STA A (i.e. occupation of the medium) may not be detected at the location of STA C. As a result, STA B receives information from STA A and STA C simultaneously and thus collision occurs. Herein, STA A may be a hidden node to STA C.

FIG. 7(b) illustrates an exemplary exposed node. In FIG. 7(b), while STA B is transmitting data to STA A, STA C has information to be transmitted to STA D. If STA C performs carrier sensing, STA C may determine that a medium is occupied due to transmission of STA B. Therefore, although STA C has information to be transmitted to STA D, STA C should wait until the medium is idle since the medium is sensed as occupied. However, since STA A is actually located out of the transmission range of STA C, transmission from STA C may not collide with transmission from STA B from the viewpoint of STA A. Thus, STA C unnecessarily waits until STA B discontinues transmission. Herein, STA C may be an exposed node to STA B.

Figure 8:
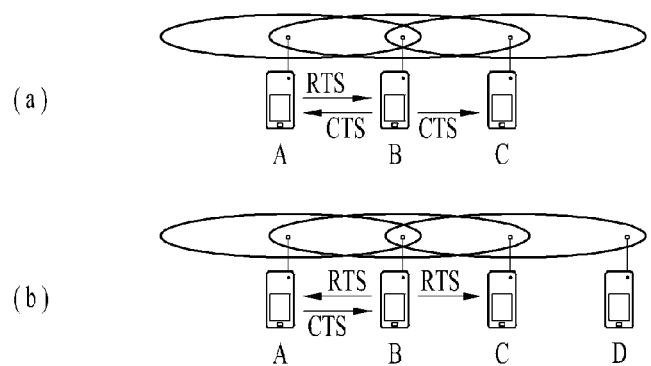
FIG. 8 is a view referred to for describing Request To Send (RTS) and Clear To Send (CTS)

FIG. 8 is a view referred to for describing Request To Send (RTS) and Clear To Send (CTS).

To efficiently utilize a collision avoidance mechanism in the exemplary situation of FIG. 7, short signaling packets such as RTS and CTS may be used. RTS/CTS between two STAs may be overheard by neighboring STA(s), so that the neighboring STA(s) may determine whether information is transmitted between the two STAs. For example, if a transmitting STA transmits an RTS frame to a receiving STA, the receiving STA may indicate to its neighboring STAs that it will receive data by transmitting a CTS frame to the peripheral STAs.

FIG. 8(a) illustrates an exemplary method for solving the hidden node problem. In FIG. 8(a), it is assumed that both STA A and STA C are to transmit data to STA B. If STA A transmits an RTS frame to STA B, STA B transmits a CTS frame to its neighboring STAs, both STA A and STA C. As a consequence, STA C waits until STA A and STA B complete data transmission, thus avoiding collision.

FIG. 8(b) illustrates an exemplary method for solving an exposed node problem. STA C may overhear RTS/CTS transmission between STA A and STA B and thus may determine that no collision will occur although STA C transmits data to another STA (e.g. STA D). That is, STA B transmits an RTS frame to all neighboring STAs and only STA A having actual transmission data may transmit a CTS frame. Because STA C receives only the RTS frame without receiving the CTS frame from STA A, it may determine that STA A is located outside the carrier sensing range of STA C.

Power Management

As described before, an STA should perform channel sensing before transmission and reception in a WLAN system. Continuous channel sensing causes continuous power consumption of the STA. Considering that power consumption in a reception state is almost the same as power consumption in a transmission state, maintaining the reception state imposes a great load on a power-limited STA (i.e. an STA operated by a battery). Therefore, if the STA is kept in a reception standby state to continuously sense a channel, the STA inefficiently consumes power, without any special advantage in terms of WLAN throughput. In avert this problem, the WLAN system supports a Power Management (PW) mode for an STA.

The PM mode of the STA is classified into an active mode and a Power Save (PS) mode. The STA basically operates in the active mode. The STA operating in the active mode is kept awake. In the awake state, the STA may perform normal operations including frame transmission and reception, channel scanning, etc. On the other hand, the STA switches between a sleep state and an awake state in the PS mode. In the sleep state, the STA operates with minimum power, without performing frame transmission and reception and channel scanning.

As the STA operates longer in the sleep state, the STA consumes less power, thus lengthening an operation time. However, the STA may not stay in the sleep state unconditionally because it is impossible to transmit or receive a frame in the sleep state. In the presence of a frame to be transmitted to an AP, a sleep-state STA may switch to the awake state and then transmit the frame in the awake state. If the AP has a frame to be transmitted to the STA, the sleep-state STA is unable to receive the frame and does not know the presence of a frame to be received. Accordingly, the STA may need to switch to the awake state in every specific period to determine the presence or absence of a frame to receive (or to receive a frame in the presence of the frame to receive).

Figure 9:
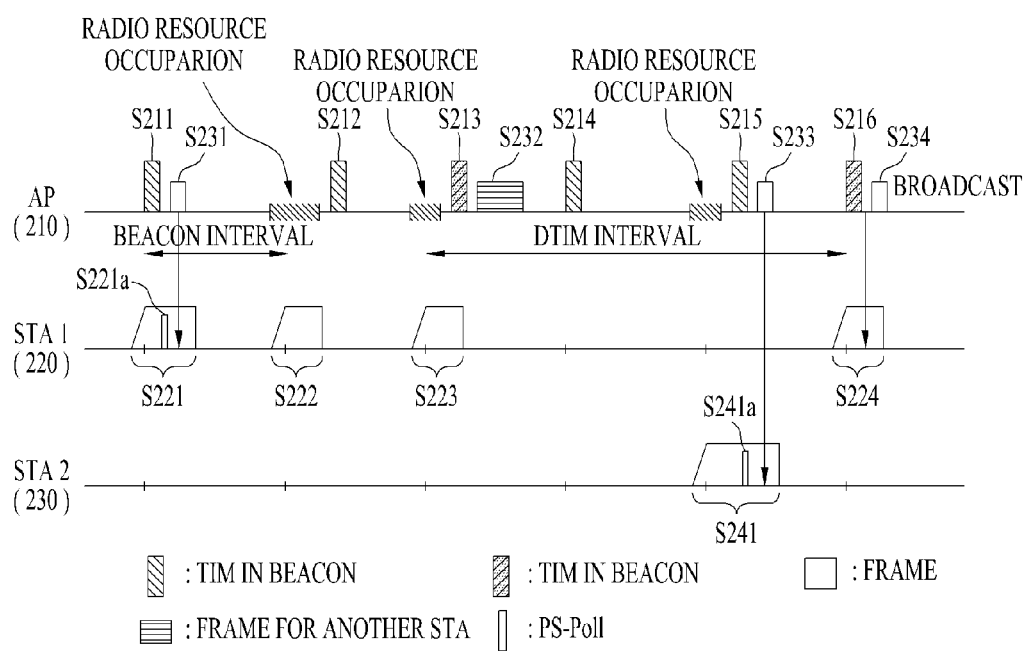
FIG. 9 illustrates a power management operation.

FIG. 9 is a view referred to for describing a power management operation.

Referring to FIG. 9, an AP 210 transmits a beacon frame to STAs within a BSS at every predetermined interval (S211, S212, S213, S214, S215, and S216). The beacon frame includes a TIM information element. The TIM information element includes information indicating that the AP 210 has buffered traffic for STAs associated with the AP 210 and will transmit frames to the STAs. The TIM information element includes a TIM indicating a unicast frame and a Delivery Traffic Indication Map (DTIM) indicating a multicast or broadcast frame.

The AP 210 may transmit a DTIM once every three beacon frame transmissions. Each of STA1 220 and STA2 222 operate in the PS mode. STA1 220 and STA2 222 may be configured to switch from the sleep state to the awake state at every wakeup interval of a predetermined period and to receive the TIM information element from the AP 210. Each STA may calculate a switching time at which it will switch to the awake state based on its own local clock. In FIG. 9, it is assumed that the STAs have the same clock as the AP.

For example, the predetermined wakeup interval may be set in such a manner that STA1 220 may switch to the awake state in each beacon interval to receive the TIM element. Accordingly, when the AP 210 first transmits the beacon frame (S211), STA1 220 may switch to the awake state (S212). STA1 220 may receive the beacon frame and acquire the TIM information element from the beacon frame. If the TIM information element indicates the presence of a frame to be transmitted to STA1 220, STA1 220 may transmit to the AP 210a a Power Save-Poll (PS-Poll) frame requesting transmission of the frame (S221a). The AP 210 may transmit the frame to STA1 220 in response to the PS-Poll frame (S231). Upon complete receipt of the frame, STA1 220 returns to the sleep state.

When the AP 210 transmits the beacon frame at a second time, another device accesses the medium and thus the medium is busy. Therefore, the AP 210 may not transmit the beacon frame at the accurate beacon interval. Instead, the AP 210 may transmit the beacon frame at a delayed time (S212). In this case, although STA1 220 switches to the awake state at the beacon interval, STA1 fails to receive the delayed beacon frame and thus returns to the sleep state (S222).

When the AP 210 transmits the beacon frame at a third time, the beacon frame may include a TIM information element configured as a DTIM. However, since the medium is busy, the AP 210 transmits the beacon frame at a delayed time (S213). STA1 220 may switch to the awake state at the beacon interval and acquire the DTIM from the beacon frame received from the AP 210. It is assumed that the DTIM indicates the absence of a frame to be transmitted to STA1 220 and the presence of a frame to be transmitted to another STA. Then, STA1 220 may return to the sleep state, determining that there is no frame to be received. After transmitting the beacon frame, the AP 210 transmits the frame to the corresponding STA (S232).

The AP 210 transmits the beacon frame at a fourth time (S214). However, since STA1 220 has not acquired information indicating the presence of traffic buffered for STA1 220 from the previous twice-received TIM information element, STA1 220 may adjust the wakeup interval to receive the TIM information element. Or if a beacon frame transmitted by the AP 210 includes signaling information for adjusting the wakeup interval of STA1 220, the wakeup interval of the STA1 220 may be adjusted. In this example, STA1 220 may be configured to change its operation state from one wake-up in every beacon interval to one wake-up in every 3 beacon intervals, in order to receive a TIM information element. Therefore, when the AP 210 transmits a fourth beacon frame (S214) and transmits a fifth beacon frame (S215), STA1 220 is kept in the sleep state and thus may not acquire a corresponding TIM information element.

When the AP 210 transmits the beacon frame at a sixth time (S216), STA1 220 may switch to the awake state and acquire a TIM information element from the beacon frame (S224). The TIM information element is a DTIM indicating the presence of a broadcast frame. Accordingly, STA1 220 may receive the broadcast frame from the AP 210 without transmitting a PS-Poll frame to the AP 210 (S234). In the meantime, a wakeup interval configured for STA2 230 may be set to be longer than the wakeup interval of STA1 220. Thus, when the AP 210 transmits the beacon frame at the fifth time (S215), STA2 230 may enter the awake state and receive the TIM information element (S241). STA2 230 may determine the presence of a frame to receive by the TIM information element and transmit a PS-Poll frame to the AP 210 to request frame transmission (S241a). The AP 210 may transmit the frame to STA2 230 in response to the PS-Poll frame (S233).

To implement the PS mode as illustrated in FIG. 9, a TIM element includes either a TIM indicating the presence or absence of a frame to be transmitted to an STA or a DTIM indicating the presence or absence of a broadcast/multicast frame. The DTIM may be configured by setting a field in the TIM element.

Figure 10:
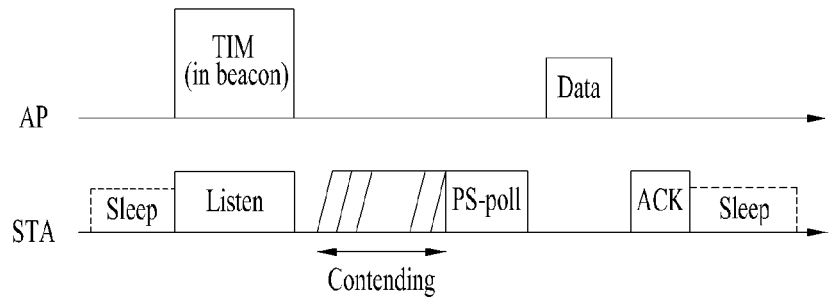
FIGS. 10, 11, and 12 illustrate an operation of a Station (STA) that has received a Traffic Indication Map (TIM) in detail.
Figure 11:
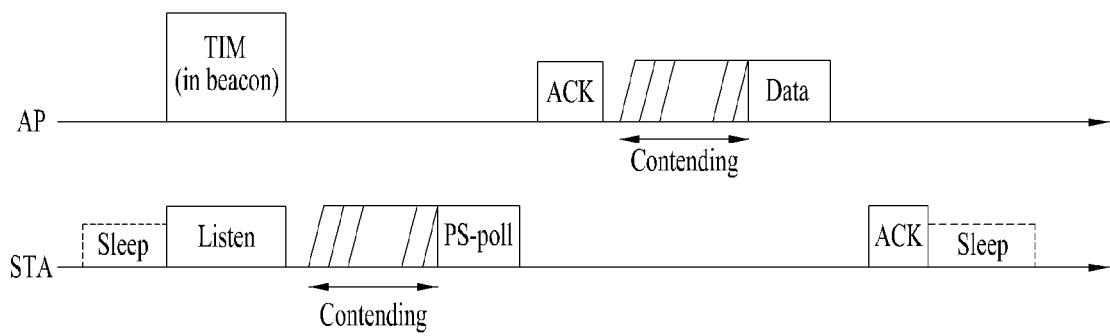
Figure 12:
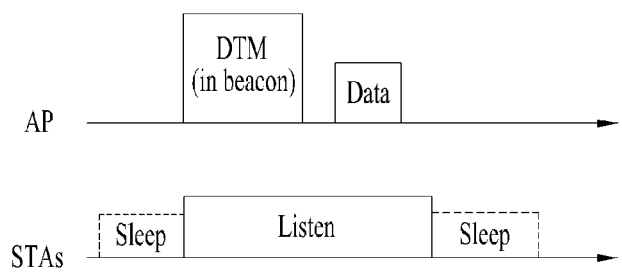

FIGS. 10, 11, and 12 are views referred to for describing an operation of an STA that has received a TIM in detail.

Referring to FIG. 10, an STA switches from a sleep state to an awake state to receive a beacon frame including a TIM element from an AP. The STA may determine the presence of buffered traffic directed to the STA by interpreting the received TIM element. After contending with other STAs to access a medium for transmission of a PS-Poll frame, the STA may transmit a PS-Poll frame requesting data frame transmission to the AP. Upon receipt of the PS-Poll frame from the STA, the AP may transmit the frame to the STA. The STA may receive a data frame and then transmit an ACKnowledgment (ACK) frame to the AP in response to the received data frame. Subsequently, the STA may return to the sleep state.

As illustrated in FIG. 10, the AP may receive the PS-Poll frame from the STA and transmits the data frame after a predetermined time (e.g. a Short InterFrame Space (SIFS)) according to an immediate response scheme. If the AP does not prepare a data frame to be transmitted to the STA during the SIFS after receiving the PS-Poll frame, the AP may operate according to a deferred response scheme, which will be described with reference to FIG. 11.

As in the example of FIG. 10, an STA switches from a sleep state to an awake state, receives a TIM from an AP, and transmits a PS-Poll frame to the AP through contention in the illustrated case of FIG. 11. If the AP does not prepare a data frame during an SIFS after receiving the PS-Poll frame, the AP may transmit an ACK frame to the STA, instead of the data frame. If the AP prepares the data frame after transmitting the ACK frame, the AP may transmit the data frame to the STA after contention. The STA may transmit, to the AP, an ACK frame indicating that the data frame has been received successfully and may switch to the sleep state.

FIG. 12 illustrates an exemplary case in which an AP transmits a DTIM. STAs may switch from the sleep state to the awake state to receive a beacon frame including a DTIM element from the AP. The STAs may determine from the received DTIM that a multicast/broadcast frame will be transmitted to them. After transmitting the beacon frame including the DTIM, the AP may directly transmit data (i.e. the multicast/broadcast frame) without receiving a PS-Poll frame. The STAs receives the data in the awake state in which they are kept after receiving the beacon frame including the DTIM. Upon complete receipt of the data, the STAs may return to the sleep state.

TIM Structure

In the PS-mode operation method based on the TIM (or DTIM) protocol described above with reference to FIGS. 9 to 12, an STA may determine whether there is a data frame to be transmitted to the STA by STA identification information included in a TIM element. The STA identification information may be information related to an AID which is allocated to an STA when the STA is associated with an AP.

An AID is used as a unique ID of each STA within one BSS. For example, the AID may be one of 1 to 2007 in the current WLAN system. In the currently defined WLAN system, 14 bits may be allocated to an AID in a frame transmitted by an AP and/or an STA. Although the AID value may be assigned up to 16383, the values of 2008 to 16383 are reserved.

An already defined TIM element is not suitable for M2M applications through which many STAs (for example, more than 2007 STAs) may be associated with one AP. If the conventional TIM structure is extended without any change, a TIM bitmap gets too large in size. As a consequence, the extended TIM structure may not be supported using a legacy frame format and is inappropriate for M2M communication for which low-rate applications are considered. In addition, it is expected that a very small number of STAs are supposed to receive a data frame during one beacon interval. Therefore, considering the afore-mentioned M2M communication application examples, it is expected that the size of a TIM bitmap will be increased but most bits of the TIM bitmap are set to zero (0) in many cases. In this context, there is a need for a method for efficiently compressing a bitmap.

Conventionally, successive zeroes at the start of a bitmap are omitted and represented by an offset (or a starting point) in order to compress the bitmap. However, if there are buffered frames for a small number of STAs but the AID values of the STAs are highly different from one another, compression efficiency is not high. For example, if buffered frames are destined for only two STAs having AIDs of 10 and 2000, respectively, the resulting compressed bitmap is of length 1990 and has all zeros except for non-zeroes at both ends. If a small number of STAs can be associated with one AP, inefficiency of bitmap compression does not matter much. On the contrary, if the number of STAs associable with one AP increases, such inefficiency may degrade overall system performance.

To overcome the problem, AIDs may be divided into a plurality of groups, for more effective data transmission. A predetermined Group ID (GID) is allocated to each group. AIDs allocated on a group basis will be described below with reference to FIG. 13.

Figure 13:
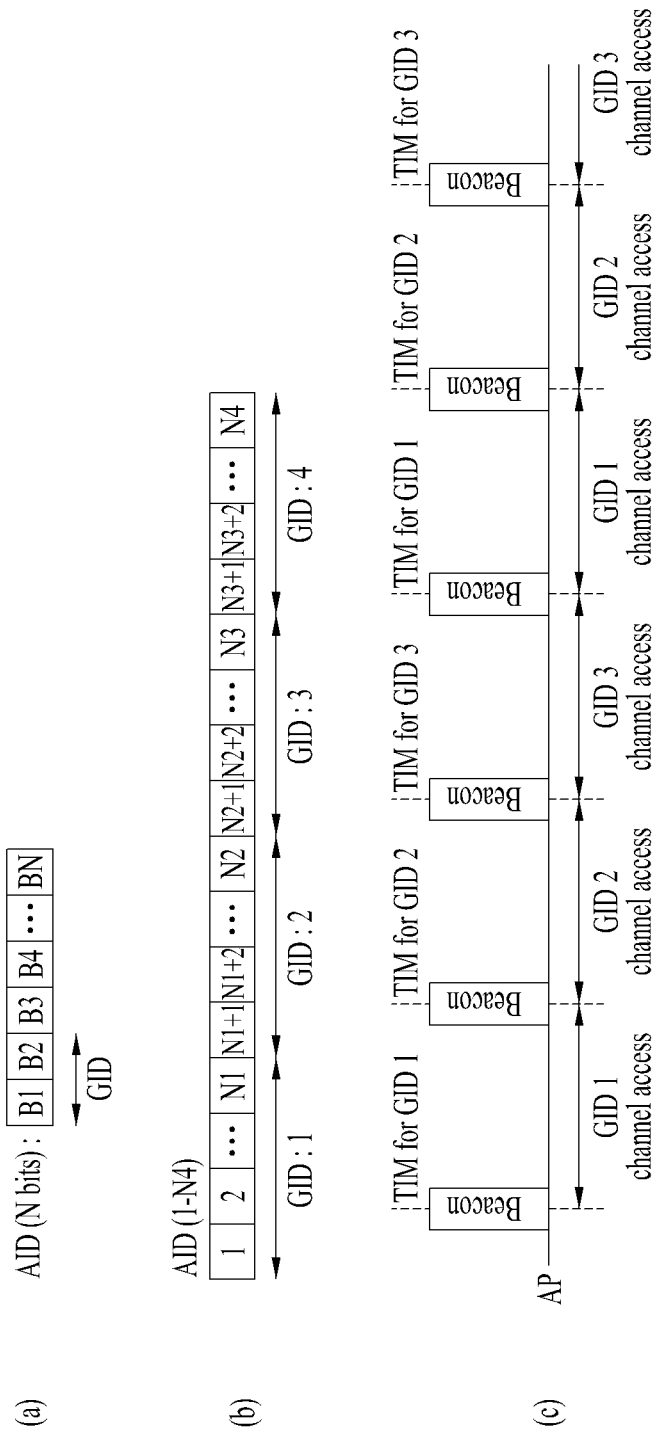
FIG. 13 is a view referred to for describing group-based Association Identifiers (AIDs)

FIG. 13(*a*) illustrates an example of AIDs allocated on a group basis. In FIG. 13(*a*), a few first bits of an AID bitmap may be used to indicate a GID. For example, 4 GIDs may be represented in the first 2 bits of the AID bitmap. If the AID bitmap includes N bits in total, the first 2 bits (B1 and B2) may represent the GID of the AIDs.

FIG. 13(*a*) illustrates another example of AIDs allocated on a group basis. In FIG. 13(*b*), GIDs may be allocated according to the positions of the AIDs. In this case, AIDs having the same GID may be represented by an offset and a length. For example, if GID 1 is represented by offset A and length B, this means that AIDs ranging from A to A+B−1 in a bitmap have GID 1. For example, it is assumed in FIG. 13(*b*) that AIDs ranging from 1 to N4 are divided into four groups. In this case, AIDs belonging to GID 1 are 1 to N1 and thus may be represented by offset 1 and length N1. AIDs belonging to GID 2 may be represented by offset N1+1 and length N2−N1+1, AIDs belonging to GID 3 may be represented by offset N2+1 and length N3−N2+1, and AIDs belonging to GID 4 may be represented by offset N3+1 and length N4−N3+1.

As this group-based AID allocation enables channel access during different time periods according to GIDs, lack of TIM elements for a large number of STAs may be overcome and data may be transmitted and received efficiently, as well. For example, channel access is available only to an STA(s) of a specific group, while channel access may be restricted for the other STA(s), during a specific time period. The specific time period during which channel access is available only to the STA(s) of the specific group may be called a Restricted Access Window (RAW).

With reference to FIG. 13(*c*), GID-based channel access will be described below. FIG. 13(*c*) illustrates an exemplary channel access mechanism based on beacon intervals, when AIDs are divided into three groups. A first beacon interval (or a first RAW) is a time period during which channel access is allowed for STAs having the AIDs of GID 1 and denied for the STAs belonging to the other GIDs. To implement this mechanism, a TIM element only for the AIDs of GID 1 is included in a first beacon. A TIM element only for the AIDs of GID 2 is included in a second beacon frame. Accordingly, channel access is allowed only for STAs having the AIDs of GID 2 during a second beacon interval (or a second RAW). A TIM element only for the AIDs of GID 3 is included in a third beacon frame, so that channel access may be allowed only for STAs having the AIDs of GID 3 during a third beacon interval (or a third RAW). A TIM element only for the AIDs of GID 1 is included in a fourth beacon frame, so that channel access may be allowed only for the STAs having the AIDs of GID 1 during a fourth beacon interval (or a fourth RAW). In the same manner, channel access may be allowed only for the STAs of a specific group indicated by a TIM included in a corresponding beacon frame during each of beacon intervals following the fifth beacon interval (or during each of RAWs following the fifth RAW).

While the order of allowed GIDs is cyclic or periodic according to the beacon intervals in FIG. 13(*c*), this should not be construed as limiting the present invention. That is, as only an AID(s) having a specific GID(s) may be included in a TIM element, channel access may be allowed only for an STA(s) having the specific AID(s) and denied for the remaining STA(s), during a specific time interval (e.g. a specific RAW).

The above group-based AID allocation scheme may be referred to as a hierarchical TIM structure. That is, a total AID space is divided into a plurality of blocks and channel access is allowed only for an STA(s) (i.e. an STA(s) of a specific group) corresponding to a specific block(s) having non-zero values. Therefore, since a large-sized TIM is divided into small-sized blocks/groups, an STA may easily maintain TIM information and the blocks/groups may be easily managed according to the class, QoS, or usage of the STA. Although FIG. 13 exemplarily illustrates a 2-level layer, a hierarchical TIM structure with two or more levels may be configured. For example, a total AID space may be divided into a plurality of page groups, each page group may be divided into a plurality of blocks, and each block may be divided into a plurality of sub-blocks. Then, the example of FIG. 13(*a*) may be extended in such a manner that first N1 bits of an AID bitmap represent a Page ID (i.e. PID), the next N2 bits represent a block ID, the next N3 bits represent a sub-block ID, and the remaining bits represent the position of STA bits included in a sub-block.

In the following examples of the present invention, STAs (or AIDs allocated to the respective STAs) may be divided into predetermined hierarchical groups and managed in various manners. However, the group-based AID allocation scheme is not limited to the specific examples.

Improved Channel Access Scheme

In the case where AIDs are allocated/managed on a group basis, STAs belonging to a specific group may access a channel only during a "group channel access interval" (or RAW) allocated to the group. If an STA supports an M2M application, traffic may be generated for the STA over a long period (e.g., tens of minutes or a few hours). Because the STA does not need to frequently maintain an awake state, it is preferred that the STA operates in a sleep state and switches to the awake state from time to time (i.e., a long wakeup interval is set for the STA). Such an STA having a long wakeup interval may be referred to as a "long sleeper" or an STA operating in a "long sleep" mode. Setting of a long wakeup interval is not limited to M2M communication. In a general WLAN operation, a long wakeup interval may be set according to the state of an STA or under circumstances.

Once a wakeup interval is set, an STA may determine whether the wakeup interval has elapsed based on its local clock. Since the local clock of the STA generally uses a low-price oscillator, the local clock may have a high error probability. If the STA operates in the long sleep mode, errors may become serious over time. As a result, the time synchronization of the STA that wakes up from time to time may not coincide with that of an AP. For example, although the STA calculates a timing at which it may receive a beacon frame and switches to the awake state based on the calculated timing, the STA may fail to receive an actual beacon from the AP at the timing. That is, the STA may miss a beacon frame due to clock drift and the beacon loss may occur more often when the STA operates in the long sleep mode.

Figure 14:
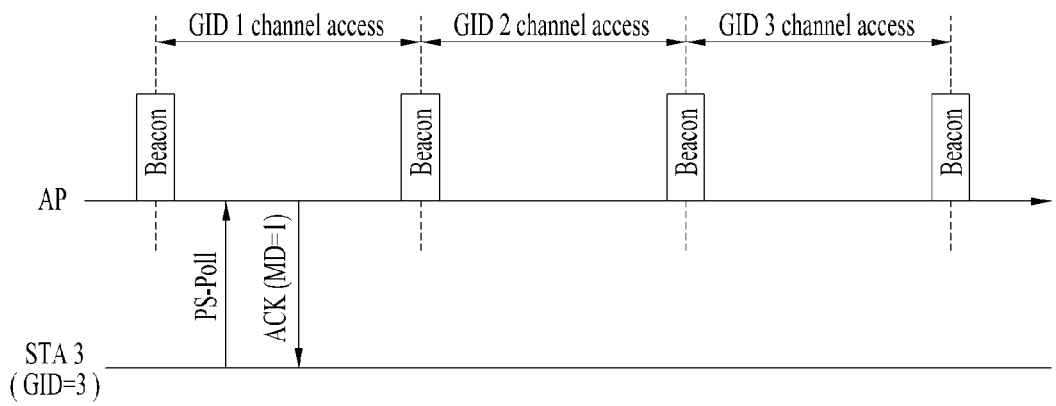
FIGS. 14, 15, and 16 illustrate exemplary operations of an STA, when group channel access intervals are set.
Figure 15:
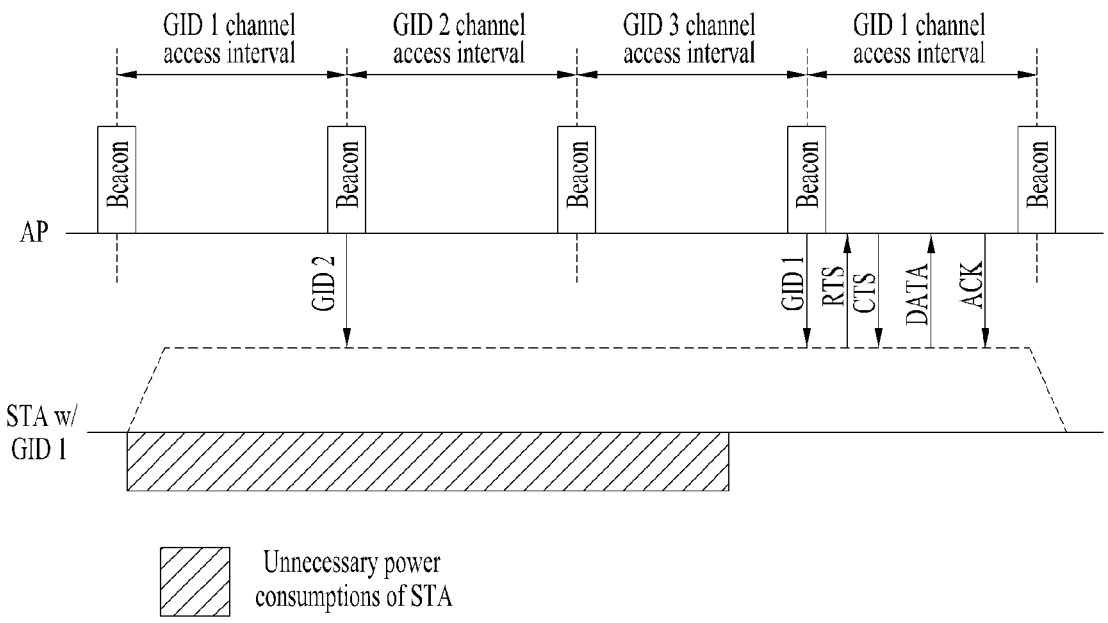
Figure 16:
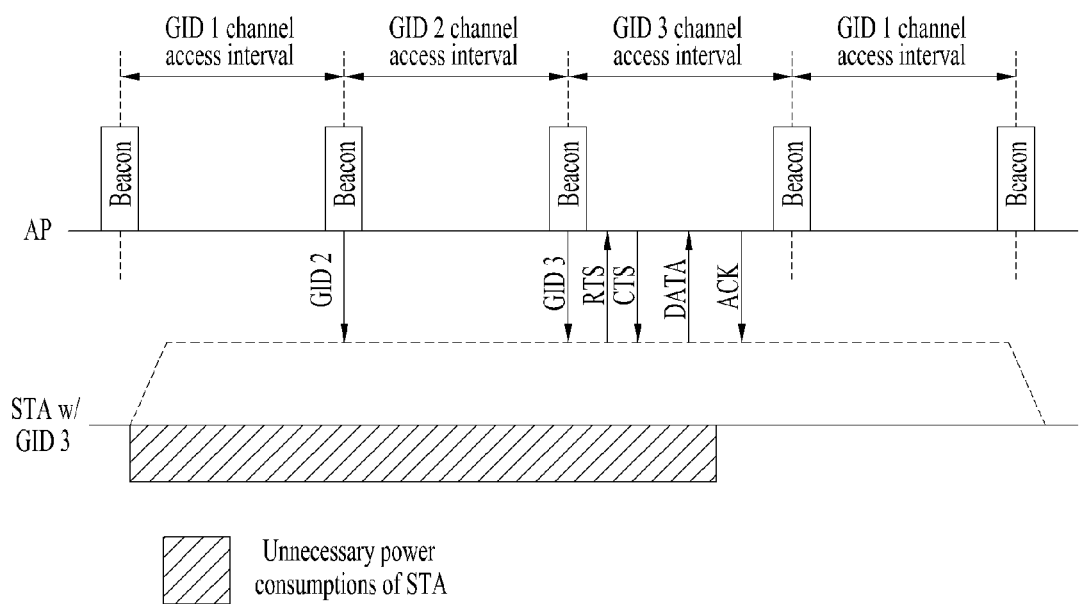

FIGS. 14, 15, and 16 illustrate exemplary operations of an STA, when group channel access intervals are set.

Referring to FIG. 14, STA3 belongs to group 3 (i.e. GID=3). STA3 may wake up in a channel access interval allocated to group 1 (i.e. GID=1) and transmit a PS-Poll frame to an AP, requesting frame transmission from the AP to STA3. Upon receipt of the PS-Poll frame from STA3, the AP transmits an ACK frame to STA3. In the presence of buffered data to be transmitted to STA3, the AP may provide information indicating it (i.e., the presence of buffered data to be transmitted to STA3) to STA3 by the ACK fame. For example, the information may be indicated by setting a 1-bit "More Data (MD)" field to 1 (i.e., MD=1) in the ACK frame.

Since STA3 transmits the PS-Poll frame at a time point within a channel access interval of group 1, even though the AP has data to be transmitted to STA3, the AP does not transmit the data immediately to STA3. Instead, the AP transmits the data to STA3 in a channel access interval allocated to group 3 (GID 3 channel access in FIG. 14).

STA3 awaits reception of the data from the AP because it has received the ACK frame with MD=1 from the AP. That is, since STA3 has not received a beacon frame shortly after waking up, STA3 transmits the PS-Poll frame to the AP, assuming that STA3 may have woken up in the channel access interval allocated to the group of STA3 and the AP may have data to be transmitted to STA3. Or STA3 may transmit the PS-Poll frame to the AP to receive data that might be destined for STA3, assuming that time is not synchronized due to its long-sleep mode operation. As the ACK frame received from the AP indicates the presence of data for STA3, STA3 awaits reception of the data, on the assumption that a current channel access interval is the channel access interval available to STA3. Even though data reception is not allowed for STA3, STA3 unnecessarily consumes power until time synchronization is acquired based on information included in a next beacon frame.

Especially when STA3 operates in the long sleep mode, STA3 does not receive a beacon frame often. Therefore, STA3 may consume power unnecessarily, for example, by performing CCA even though the current channel access interval is not for STA3.

FIG. 15 illustrates a case where an STA having GID 1 (i.e. belonging to group 1) misses a beacon frame at its wake-up timing. As the STA fails to receive a beacon frame with the GID (or PID) allocated to the STA, the STA waits in the awake state until receiving a beacon frame with its GID (or PID). That is, even though the STA wakes up in a channel access interval allocated to the STA, the STA does not know whether the wake-up timing falls into the channel access interval allocated to its group because it has not checked whether a TIM included in a beacon frame includes its GID (or PID).

As described above, the STA, which has switched from the sleep state to the awake state, is kept in the awake state until receiving a fourth beacon frame with its GID (i.e. GID 1) after missing a first beacon frame, thereby consuming power unnecessarily. After the unnecessary power consumption, the STA may eventually receive a beacon frame including GID 1 and may thus perform RTS transmission, CTS reception, data frame transmission, and ACK reception based on the received beacon frame.

FIG. 16 illustrates a case where an STA wakes up in a channel access interval allocated to another group. For example, an STA with GID 3 may wake up in a channel access interval for GID 1. That is, after waking up, the STA with GID 3 waits until receiving a beacon frame including its GID, consuming power unnecessarily. Upon receipt of a TIM indicating GID 3 in a third beacon frame, the STA may recognize a channel access interval allocated to its group and perform data transmission and ACK reception by RTS- and CTS-based CCA.

Simultaneous Access from Multiple STAs

If a large number of STAs attempt to access an AP simultaneously, serious congestion may occur due to authentication request frames transmitted by the STAs and/or association request frames transmitted by the STAs after authentication. For example, if a large number of STAs (e.g., passive scanning-mode STAs attempting access after receiving beacon frames) are disconnected almost at the same time and then attempt access almost at the same time (attempt transmission of authentication/association request frames) in the event of power outage, disaster, etc., the resulting congestion may not be overcome just with the afore-described random backoff procedure.

In a conventional method for overcoming congestion, an STA determines based on a reference value received from an AP whether the STA can access the AP (for example, the STA generates a random value and determines whether it can access the AP by comparing the random value with the reference value received from the AP). However, the STA determines whether it can access the AP, simply based on a hard level probability. Thus, the STA may suffer from a long latency until it succeeds in accessing the AP. For example, if random values generated by a large number of STAs do not reach the reference value, a medium may be left empty unnecessarily. Or more STAs than can access a channel actively may generate random values equal to or larger than the reference value. Even though the AP sets the reference value based on an estimate of a previous traffic pattern or medium use amount, it may not be easy to ensure the reliability of the reference value.

Accordingly, a description will be given of a channel access method for efficiently overcoming congestion that may occur when a large number of STAs access a medium simultaneously (when a large number of STAs attempt to transmit authentication/association request frames simultaneously). The following description is related mainly to, but not limited to, an authentication/association request frame. Thus the description is applicable to access control of transmission of a frame other than the authentication/association request frame. In the following description, an STA may be either an AP STA or a non-AP STA, as described before.

Access According to Embodiment of the Invention

An STA may randomly determine a starting point of its channel access (e.g., a starting point of transmission of an authentication/association request frame) based on a specific parameter value. For example, on the assumption that the specific parameter value is an interval or window including channel access opportunities (e.g., time slots) (a channel access opportunity may be a basic time slot unit in which an STA performs backoff), the STA may determine a random starting point of its channel access within the window.

In other words, after the STA randomly selects a specific resource unit (e.g., a time slot related to authentication/association) or a second parameter indicating the specific resource unit, the STA may access a medium in the randomly selected resource unit. If determining that the medium is idle by carrier sensing or the like, the STA may transmit a specific frame (an authentication/association request frame) in the medium. If the medium is busy, the STA may start the afore-described random backoff procedure (for DCF or EDCA). That is, if the medium is busy, the second parameter may indicate the starting point of a random backoff procedure for transmitting a specific frame.

As described above, the STA may randomly select a starting point of random backoff. Thus, STAs may distribute their frame transmissions for channel access within a specific time window, instead of simultaneously accessing a channel. Compared to the conventional method for determining at a hard level whether an STA can access, this method may solve the channel access congestion problem at a softer level. Further, the constraint that it should be determined again whether a medium is accessible when the medium is not accessible, that is, the problem that random value generation/comparison, etc. should be repeated to determine whether an STA can access in the conventional method may be solved.

Figure 17:
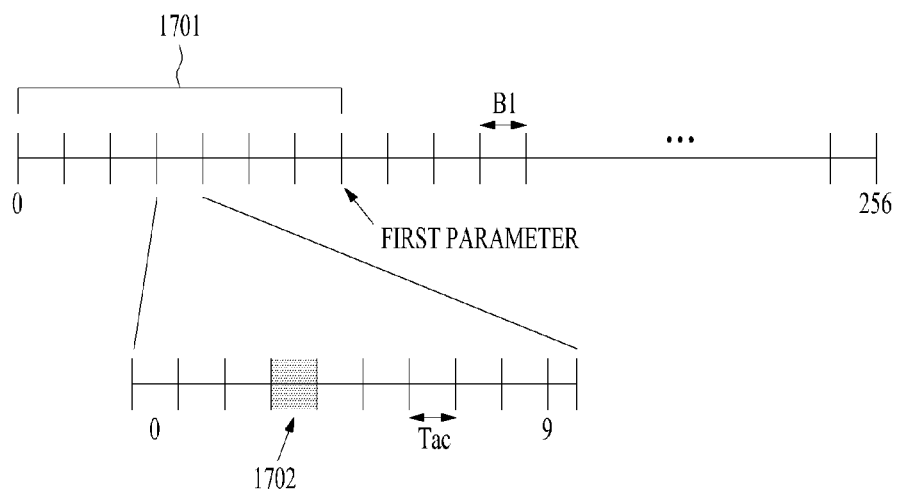
FIG. 17 illustrates an embodiment of the present invention.

The above description will be detailed with reference to FIG. 17. Referring to FIG. 17, it is noted that an STA may select one time slot 1702 from among a plurality of time slots included in a window 1701 defined based on a first parameter. The time slot 1702 may be selected randomly and specific methods for the random selection will be described below. The size of a time slot may be Tac (equal to the length of a slot related to authentication control) and the first parameter may be selected/indicated in units of a Beacon Interval (BI).

One time slot may be selected randomly within the window. For example, since one window includes 63 (=7×9) time slots in the illustrated case of FIG. 17, the STA may randomly select the one time slot 1702 from among time slots 0 to 62. In another method for randomly selecting a time slot, a time slot may be selected using a modulo function, a hash function, or a specific bit (a Least Significant Bit (LSB) or a Most Significant Bit (MSB)) based on an ID of the STA (e.g., a MAC address or AID of the STA). For example, if a window includes 16 time slots and the ID of an STA is 200, the STA may select an eighth time slot (=200 mod 16). That is, the second parameter may be a value obtained by modulo-operating the ID of the STA with the number of time slots included in a range indicated by the first parameter. A time slot may be selected randomly based on a channel access class/group. For example, if there are 16 time slots and 4 groups, an STA belonging to a first group may select a random time slot from among time slots 0 to 4, as its starting point of channel access. If an STA attempting random channel access in an interval assigned to the group of the STA fails to take an opportunity within the interval, the STA may attempt channel access by spillover to an interval assigned to another group.

In the above description, the AP may transmit window parameters (including a first parameter). More specifically, the AP may transmit the window parameters in a beacon frame. The beacon frame may be a full beacon frame or a short beacon frame. The full beacon frame may be transmitted periodically based on a long-term estimated traffic pattern and (management) frame exchange tracking result of an STA. The short beacon frame may deliver a short-term measurement/tracking result. In another method, the window parameters may be transmitted in a probe response frame. The window parameters may be transmitted in a broadcast probe response frame to STAs that receive the probe response frame at the same time (e.g., when one probe response frame is broadcast to a plurality of STAs that are within a specific time boundary and use the same content information in order to prevent a probe response frame storm phenomenon). Or the window parameters may be transmitted to each STA in a unicast probe response frame.

A window parameter transmitted by the AP may be a new EDCA parameter. That is, an extended contention window value may be indicated in an existing EDCA parameter format, rather than a new window parameter is defined. Herein, a field indicating the contention window value and the size of the field may be optimized.

If an STA attempts reauthentication/reassociation to the AP, the STA may attempt access using a previous received window parameter value. Or after the STA awaits reception of a next beacon frame and receives a new window parameter, the STA may attempt reauthentication/reassociation (in the case where the AP transmits the window parameter in the beacon frame). If a change in an existing traffic pattern and medium access frequency or an existing situation of attempting access to the AP is equal to or larger than a threshold/reference value (e.g., if the change is a fast decrease, etc.), the AP may transmit window parameter information in a next beacon frame, determining that a large number of STAs will attempt authentication/association (almost) simultaneously due to power outage, disaster, etc.

Setting and transmission of a window parameter value may be time-variant as described below.

As a plurality of STAs are restored from power outage or the like, the number of STAs attempting reassociation may be decreased gradually. Therefore, the window parameter value may also be decreased gradually. The AP may decrease the window parameter value at each transmission. Or the AP may control the number/frequency of transmissions of the window parameter. In another aspect, considering that fewer STAs attempt reauthentication/reassociation along with restoration of a situation such as power outage or the like but STAs succeeding in association will attempt data transmission, it may not be necessary to change the window parameter value from the viewpoint of overall medium use. Therefore, once a window parameter value is set, the window parameter value may be updated over a long term or may be transmitted at the period of multiple beacon frames.

The foregoing various embodiments of the present invention may be implemented independently or in combination of two or more.

Figure 18:
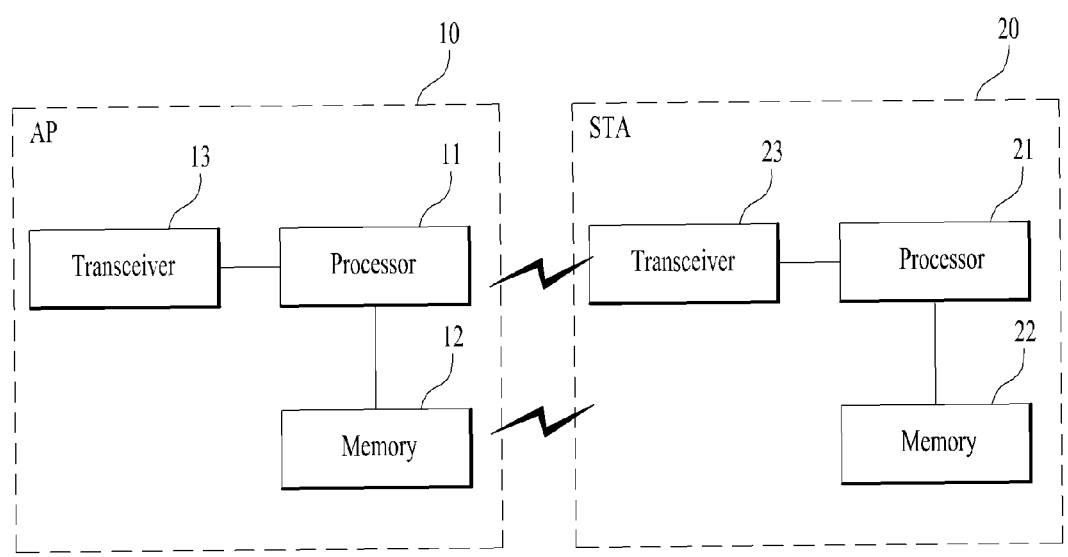
FIG. 18 is a block diagram of wireless apparatuses according to an embodiment of the present invention.

FIG. 18 is a block diagram of wireless apparatuses according to an embodiment of the present invention.

Referring to FIG. 18, an AP 10 may include a processor 11, a memory 12, and a transceiver 13. An STA 20 may include a processor 21, a memory 22, and a transceiver 23. The transceivers 13 and 23 may transmit/receive wireless signals and may implement, for example, a physical layer of an IEEE 802 system. The processors 11 and 21 are connected to the transceivers 13 and 21, respectively, and may implement the physical layer and/or a MAC layer of the IEEE 802 system. The processors 11 and 21 may be configured to perform operations according to the above-described various embodiments of the present invention. Modules for implementing operations of the AP and STA according to the above-described various embodiments of the present invention may be stored in the memories 12 and 22 and executed by the processors 11 and 21. The memories 12 and 22 may reside inside or outside the processors 11 and 21 and may be connected to the processors 11 and 21 by a known means.

The AP 10 and STA 20 may be configured so that the above-described various embodiments of the present invention are implemented independently or in combination of two or more. A redundant description is omitted for clarity.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the various embodiments of the present invention have been described in the context of an IEEE 802.11 system, they are applicable in the same manner to many other mobile communication systems.

The invention claimed is:

1. A method of accessing a medium for transmitting an authentication request frame by a station (STA) in a wireless communication system, the method comprising:
   receiving a first parameter for authentication control from an access point (AP) with which the STA is associated;
   determining a first range for authentication control using the first parameter for authentication control;
   randomly selecting a second parameter within the first range for authentication control, the selected second parameter indicating a starting point of channel access procedure for transmitting the authentication request frame; and
   starting the channel access procedure at the starting point indicated by the second parameter,
   wherein the channel access procedure started at the starting point indicated by the second parameter includes:
      performing carrier sensing on a medium during an inter-frame space (IFS); and performing a random backoff procedure by randomly selecting a random backoff count corresponding to a time slot within a second range of a contention window (CW), if the medium is busy.

2. The method according to claim 1, wherein performing of the random backoff procedure comprises:
starting a backoff timer set to the random backoff count;
decreasing the backoff timer in units of a slot time while the medium is idle; and
transmitting the authentication request frame, upon expiration of the backoff timer,
wherein, if it is determined that the medium is busy during decreasing the backoff timer, the decreasing is discontinued.

3. The method according to claim 1, wherein the first range comprises time slots for the authentication request frame.

4. The method according to claim 1, wherein the station is one of a plurality of stations attempting transmission of the authentication request frame simultaneously.

5. The method according to claim 1,
wherein the second parameter is a number of a time slot included in the first range determined based on the first parameter, and
wherein the second parameter is determined by modulo-operating an Identifier, ID, of the station with the number of time slots included in the first range determined based on the first parameter.

6. The method according to claim 1, wherein if the station is included in a channel access group, selection of the second parameter is limited to a time slot allocated to the channel access group in the first range determined based on the first parameter.

7. The method according to claim 1, wherein if the station performs re-association with the access point, the station uses a first parameter received before the reassociation.

8. The method according to claim 1, wherein a value of the first parameter is decreased, each time the first parameter is transmitted by the AP.

9. The method according to claim 1, wherein the first parameter is included in one of a beacon frame, a short beacon frame, a unicast probe response frame and a broadcast probe response frame.

10. The method according to claim 1, wherein the random backoff procedure is for an Enhanced Distributed Channel Access (EDCA).

11. A Station (STA) for accessing a medium for transmitting an authentication request frame in a wireless communication system, the station comprising:
a receiver to receive a first parameter for authentication control from an access point (AP) with which the STA is associated; and
a processor to
determine a first range for authentication control using the first parameter for authentication control,
randomly select a second parameter within the first range for authentication control, the selected second parameter indicating a starting point of channel access procedure for transmitting the authentication request frame; and
start the channel access procedure at the starting point indicated by the second parameter,
wherein the channel access procedure started at the starting point indicated by the second parameter includes:
performing carrier sensing on a medium during an inter-frame space (IFS); and
performing a random backoff procedure by randomly selecting a random backoff count corresponding to a time slot within a second range of a contention window (CW), if the medium is busy.

12. The STA according to claim 11,
wherein in performing of the random backoff procedure, the processor starts a backoff timer set to the random backoff count, decreases the backoff timer in units of a slot time while the medium is idle, and transmit the authentication request frame, upon expiration of the backoff timer, and
wherein, if it is determined that the medium is busy during decreasing the backoff timer, the decreasing is discontinued.

13. The STA according to claim 12, wherein the first range comprises time slots for the authentication request frame.

14. The STA according to claim 11, wherein the station is one of a plurality of stations attempting transmission of the authentication request frame simultaneously.

15. The STA according to claim 11,
wherein the second parameter is a number of a time slot included in the first range determined based on the first parameter, and
wherein the second parameter is determined by modulo-operating an Identifier of the station with the number of time slots included in the first range determined based on the first parameter.

16. The STA according to claim 11, wherein if the station is included in a channel access group, selection of the second parameter is limited to a time slot allocated to the channel access group in the first range determined based on the first parameter.

17. The STA according to claim 11, wherein if the station performs re-association with the access point, the station uses a first parameter received before the reassociation.

18. The STA according to claim 11, wherein a value of the first parameter is decreased, each time the first parameter is transmitted by the AP.

19. The STA according to claim 11, wherein the first parameter is included in one of a beacon frame, a short beacon frame, a unicast probe response frame and a broadcast probe response frame.

20. The STA according to claim 11, wherein the random backoff procedure is for Enhanced Distributed Channel Access (EDCA).

* * * * *